United States Patent [19]
Macy et al.

[11] Patent Number: 6,070,303
[45] Date of Patent: Jun. 6, 2000

[54] CLIPPER

[76] Inventors: Peter M. Macy, 14 Washburn St., Watertown, Mass. 02172; Robert N. Shelton, 358D Mountain Rd, Princeton, Mass. 01541

[21] Appl. No.: 09/270,575

[22] Filed: Mar. 16, 1999

Related U.S. Application Data

[63] Continuation of application No. 08/506,613, Jul. 25, 1995, abandoned, which is a continuation-in-part of application No. 08/390,976, Feb. 21, 1995, abandoned.

[51] Int. Cl.[7] .................................................. A44B 21/00
[52] U.S. Cl. ................................. 24/3.3; 24/3.4; 351/157; 224/257
[58] Field of Search .................................. 24/3.3, 3.4, 3.6, 24/3.12, 600.9; 351/157, 155; 224/257, 236, 242

[56] References Cited

U.S. PATENT DOCUMENTS

| | | | |
|---|---|---|---|
| 104,216 | 6/1870 | Sickels | 351/155 X |
| 553,325 | 1/1896 | Zestermann | 24/3.3 X |
| 852,599 | 5/1907 | Dripps . | |
| 962,065 | 6/1910 | Thompson . | |
| 2,467,251 | 4/1949 | Bowman | 351/155 X |
| 2,766,500 | 10/1956 | Chanko . | |
| 2,818,621 | 1/1958 | Pretz . | |
| 2,876,513 | 3/1959 | McIntosh | 24/3.3 X |
| 3,259,348 | 7/1966 | Dann | 351/155 X |
| 3,702,671 | 11/1972 | Cirillo | 224/242 |
| 4,152,051 | 5/1979 | Van Tiem et al. . | |
| 4,454,737 | 6/1984 | Toyoda . | |
| 4,779,778 | 10/1988 | Nixon, II . | |
| 4,885,808 | 12/1989 | Carpenter . | |
| 4,889,420 | 12/1989 | Bradshaw, II et al. . | |
| 4,930,740 | 6/1990 | Vogt | 24/3.3 X |
| 4,938,581 | 7/1990 | Trickel . | |
| 4,949,432 | 8/1990 | Wisnewski | 24/3.3 |
| 5,129,617 | 7/1992 | MacWilliason | 24/3.3 X |
| 5,305,934 | 4/1994 | Grey . | |
| 5,361,956 | 11/1994 | Recanati | 224/257 |
| 5,367,347 | 11/1994 | Wilson et al. | 24/3.3 X |
| 5,379,928 | 1/1995 | Mikkelsen | 24/3.4 X |
| 5,794,312 | 8/1998 | O'Mahony | 24/3.3 |
| 5,864,924 | 2/1999 | Rodriguez | 24/3.3 |

FOREIGN PATENT DOCUMENTS

2191932  12/1987  United Kingdom ................... 351/157

*Primary Examiner*—Peter M. Cuomo
*Assistant Examiner*—Hanh V. Tran
*Attorney, Agent, or Firm*—Ernest V. Linek; Banner & Witcoff, Ltd.

[57] ABSTRACT

A pendant-like device which hangs around the neck and holds clip-on sunglasses (or similar eyewear) in a forward-facing position at mid-chest level. All models consist of a pendant that is suspended at mid-chest level by a cord which loops behind the neck of the user.

3 Claims, 9 Drawing Sheets

CLIPPER

CROSS-REFERENCE TO RELATED APPLICATIONS

This application is a continuation of application Ser. No. 08/506,613, filed Jul. 25, 1995, now abandoned, which in turn is a continuation in part of application Ser. No. 08/390,976, filed Feb. 21, 1995, now abandoned.

BACKGROUND OF THE INVENTION

The present invention is a carrying clip for eyewear, particularly eyewear known as "clip-on" sunglasses. Such sunglasses are worn over conventional eyeglasses when required by the wearer. Often these sunglasses are misplaced due to a lack of a convenient carrying mechanism. The carrying clip of the present invention will be marketed under the trademark "THE CLIPPER™". Related articles are described in the following patents:

INFORMATION DISCLOSURE

U.S. Pat. No. 5,305,934 (Grey), entitled Tool and Eyeglass Holder, describes a device for hanging a pair of eyeglasses about the neck of a user which includes an elongated flexible member for being positioned about the neck. The elongated member has first and second terminal ends. A container having a generally hollow, interior cavity and an opening for accessing the cavity is secured to the first and second terminal ends of the elongated member. A tool is at least partially positioned within the cavity. The tool is sized to pass through the opening for allowing the user to access and use the tool. Spare parts can be housed within the cavity for use in repairing the pair of eyeglasses.

U.S. Pat. No. 4,938,581 (Trickel), entitled Holder For Use With Eyewear, describes a holder for use with eyewear having spaced apart lens portions connected by a nose portion which the eyewear, when not in use is, conveniently suspended form the user's neck, the holder being in the form of a member of flexible plastic material, such as teflon, having opposed generally parallel sides, a top and having a cutout providing communication with the member external peripheral surface and having an unlocked mode providing an opening to receive the nose portion of the eyewear therein so that the nose portion is loosely received in the cutout and providing a locked mode in which the eyewear nose portion is surrounded and retained by the member, a cord of length to loop around the neck of the user, and an opening in the holder through which the cord passes by which the member is retained.

U.S. Pat. No. 4,889,420 (Bradshaw II et al.), entitled Method and Means For Securing Glasses To a Sun Visor, describes a device which includes a plastic body member having a pair of upwardly spaced-apart legs and a pair of downwardly spaced-apart legs. The downwardly spaced-apart legs are adapted to spring apart and yieldably grip an automobile sun visor therebetween. The upwardly spaced legs have an elastomeric member therein which forms a V-shaped slot for receiving the nose frame of a pair of glasses.

U.S. Pat. No. 4,885,808 (Carpenter), entitled Headband with Multi-positioned Lens Piece, describes a multi-position lens piece removably attached to an absorbent headband wherein a spring member exerts a rotation-resisting force against the connecting member between lens to prevent unwanted rotation of the lenses during use.

U.S. Pat. No. 4,779,778 (Nixon II), entitled Music Article Jewelry System, describes an apparatus for removably yet stably retaining and attractively suspending an article used for playing a musical instrument. The apparatus, which can double as a jewelry system, includes a spring-loaded clip having two opposing arms, one of which includes a stabilizing projection. The clip removably retains a pick and a pick sleeve encasing the pick. Both the pick and pick sleeve have slots through their planar surfaces which receive the stabilizing projection of the clip arm when the encased pick is retained by the clip. The apparatus also includes a flexible loop element connected to the clip which loops upon itself and allow the clip and encased pick to be suspended from any structure encircled by the looped element.

U.S. Pat. No. 4,454,737 (Toyoda), entitled Key Holder, describes a key holder mechanism which includes a body and a key pivotably mounted on the body and movable between an operating position in which the key is housed within the body. The key holder may also include a biassing member for maintaining the key at the operating position thereof or the non-operating position thereof and the key may include a stopper member disposed thereon which is engageable with the body to maintain the key at the non-operating position thereof.

U.S. Pat. No. 4,152,051 (Van Tiem et al.), entitled Eyeglasses, describes eyeglasses comprising a headband adapted to encircle the head of a wearer, an eyeglass frame, and a pivot support removably mounted on the headband and supporting the eyeglass frame for incremental movements to position into and out of the line of sight of the wearer.

U.S. Pat. No. 2,818,621 (Pretz), entitled Holder for Eyeglasses, describes a carrier device for eyeglasses, comprising a tube having spaced openings in its rear wall, a pair of rings mounted in the openings, at least one other pair of rings supporting the first pair of rings, an ornamental pin having means secured to the second pair of rings, whereby said pin, when mounted on a garment of a user, is adapted to maintain the tube in substantially vertical position, with the rear wall of the tube abutting the garment of the user, whereby the tube is capable of free pivoting movement for positioning a temple of the eyeglasses within the holder.

U.S. Pat. No. 2,766,500 (Chanko), entitled Spectacle Suspender Clamp, describes spectacle (eyeglass) supports of the type worn around a person's neck. One object of this invention is to provide a spectacle suspender in the form of a strap or similar flexible suspension member which is adapted for wear around a person's neck and carries at its ends readily attachable and detachable clamps of an improved construction to which the temples of spectacles may releasably be attached.

U.S. Pat. No. 962,065 (Thompson), entitled Eyeglass-Holder, describes eyeglass holders comprising a single pierce of wire provided with a pin; a hook under which said pin fits: a front bar portion; a loop to hold the eyeglasses extending in a plane at right angles to the plane containing said pin and front bar portion; and a further portion of said wire extending at right angles to said loop and parallel to said front bar portion, adapted to close said loop.

U.S. Pat. No. 852,599 (Dripps), entitled Eyeglass-Holder, describes improvements in eyeglass holders wherein the eyeglasses are suspended from suitable means, as a chain, adapted to be coiled by spring action within a casing or inclosure and more especially to hooks therefor. The eyeglass holder comprises a casing for inclosing the eyeglass suspending means, and a spring hook effective for upholding the eyeglasses out of a dangling position having an upward and outward deflected portion and an inward-extending projection conformed to and engaging the lower front portion of said casing, and its free end contacting with the opposite portion of said hook.

Clearly, there is a need for continued improvement in devices designed to hold eyewear such as sunglasses and/or eyeglasses, as evidenced by the above described samples of this art. The present invention, trademarked "THE CLIPPER™" represents yet another improvement in this field.

SUMMARY OF THE INVENTION

THE CLIPPER™ carrying clip for eyewear is a combination of fashion and utility that in particular solves the problem of carrying clip-on sunglass frames when the frames are not in use. The only convenient means of carrying such frames that is currently available is the "clip-and-flip" design. The clip-and-flip design has hinged prongs attached to the clip-on frame itself, which grip the eyeglasses frame or lenses from the top and allow the sunglass frame to rotate 90 degrees up and away from the eyeglasses when not in use. Clip-and-flips are decidedly unattractive. Many makers of eyeglasses do not offer the clip-and-flip design, because of its lack of fashion appeal.

The alternative to clip-and-flips is the tension-mounted design. This design is mounted on the eyeglass frame by means of tension that is generated by a connecting bar located at the top of the clip-on frame, to which the lenses are attached. The bar is generally made of a spring-metal material. At the outside edges of the lenses are four small hooks (generally about one-eighth of an inch long each, two on each lens). These hooks grip the outside edges of the eyeglass frames when the connecting bar is unflexed and flexes back again.

Tension-mounted clip-on sunglasses have no integral means of being carried when not in use. If placed in a shirt pocket, jacket pocket or purse, the hooks snag on papers, cards, pens or other objects in the garment (including the garment itself) when the user retrieves the sunglasses. If placed in a pants pocket, the connecting bar may bend or break when the user sits down. In addition, the clip-ons may be damaged if the user bumps against a table, chair, counter or other object.

If placed on a table, counter or other surface when not in use, clip-ons may be damaged or left behind. Many models of clip-on sunglasses cost as much as $70 or more. Users do not want to lose them.

Tension-mounted clip-ons may be placed into a carrying case when not in use, in order to avoid some of the above problems. Placing the sunglasses into the case is not convenient, however, particularly when engaged in active pursuits such as hiking, biking or other sports. In addition, the need to carry the case around complicates rather than simplifies the carrying problem.

THE CLIPPER™ carrying clip is a pendant-like device which hangs around the neck and holds clip-on sunglasses in a forward-facing position at mid-chest level. All models consist of a pendant that is suspended at mid-chest level by a cord which loops behind the neck of the user.

The pendant grips clip-on frames by any of several means, including friction, spring tension or a flexible barrier. The three general types are grooved model, the flange-type ("flanged") model and the parallel wire model. Grooved models have a groove that is cut into the pendant, either from the back (i.e., the surface which faces the chest of the user) or the top (i.e., the surface which faces up when the device is being worn). Flanged and parallel wire models have two U-shaped flanges which project from the pendant. The groove or the flanges hold the connecting bar of a pair of clip-on sunglasses.

A fourth model has two vertical channels on the sides of the pendant and utilizes the tension exerted on the lenses of the clip-on frame by the spring-steel bar which connects them to hold the frame onto the pendant. This model is referred to herein as the "side-channel" model.

In the grooved, flanged and parallel wire models, the center of the connecting bar on the clip-on frame is inserted into the groove or the flanges. Friction from the flanges or groove (supplemented by a flexible plastic barrier over the groove on some models) grips the connecting bar and holds the sunglasses securely. The lenses of the sunglasses hang down in front of the user, facing forward in a natural manner.

Models of THE CLIPPER™ carrying clip which use spring tension in the pendant to grip the clip-on frames are hinged at the bottom of the groove. The sides of the groove press together as a result of the spring tension, which causes the groove to grip the clip-on frame.

The cord on grooved and flanged models is attached at the top of the pendant. Attachment is accomplished by connecting the ends of the cord directly to the top surface, or by looping the cord through a ring aperture that is attached to the top surface of the pendant.

The parallel wire model of pendant has a wire pendant that parallels the connecting bar of the clip-on frame. Flanges at the center of the wire pendant grip the center of the connecting bar. The cord is attached at the outer ends of the wire pendant. This model remains attached to the clip-on frame while the clip-ons are in use. The cord is held out of the user's line of vision by the width of the wire pendant. When the clip-ons are removed from the eyeglasses, the user lowers the clip-ons until the cord of THE CLIPPER™ carrying clip is fully extended. THE CLIPPER™ carrying clip and the clip-on frames then hang together in front of the user.

The side-channel model has a groove, or channel, running from top to bottom of each vertical side (i.e., the vertical surfaces which are perpendicular to the user's chest when the pendant is being worn), and a shallower channel running horizontally across the top side and connecting the two side channels. The lenses of a clip-on frame are inserted, in a forward-facing position, into the channels from the top of the pendant. As the lenses slide down into the channels, the tension of the spring-bar holds the lenses onto the pendant. The clip-ons then hang down in front of the user, facing forward in a natural manner.

The cord of THE CLIPPER™ carrying clip is either joined at both ends to the pendant by means of a fixed or detachable fastener, or inserted at both ends through the pendant like the cord of a bolo tie. One end of a joined/detachable cord is removable. Such end is attached by a screw device, by friction or by a squeeze-release fastener.

BRIEF DESCRIPTION OF THE DRAWINGS

FIGS. 1(A and B) show two distance views of THE CLIPPER™ carrying clip:

Drawing "A" is a view of the groove and flanged models.
Drawing "B" is a view of the parallel wire model.

FIGS. 2(A–F) show full-scale drawings of the basic grooved model of the pendant:

Drawing "A" is a 45° representation, viewed from the front of the pendant.
Drawing "B" is a 45° representation, viewed from the back of the pendant.

(NOTE: Neither Drawing "A" nor Drawing "B" shows the friction material which lines the groove.)

Drawing "C" is a 45° representation, viewed from the side of the pendant.

Drawing "C" shows a preferred friction material (Velcro) which lines the groove.)

Drawing "D" is identical to Drawing "B", except that it shows the flexible plastic barrier which may cover the groove.

Drawing "E" is identical to Drawing "C", except that it shows the flexible plastic barrier which may cover the groove.

Drawing "F" is a full-scale drawing of the grooved pendant gripping a clip-on sunglasses frame, viewed from the back. (The sunglasses are not part of the patent.)

FIGS. 3(A–C) show full-scale drawings of a variation of the basic grooved model of pendant, in which the groove is angled downward:

Drawing "A" is a 45° representation, viewed from the front of the pendant (not showing friction material which lines the groove).

Drawing "B" is a 45° representation, viewed from the back of the pendant (not showing friction material which lines the groove).

Drawing "C" is a 45° representation, viewed from the side of the pendant (not showing friction material which lines the groove).

FIGS. 4(A–D) show full-scale drawings of hinged-groove models of pendant:

Drawing "A" is a 45° representation of the fixed-hinge design, viewed from the front of the pendant.

Drawing "B" is a 45° representation of the fixed-hinge design, viewed from the side of the pendant.

Drawing "C" is a 45° representation of the live-hinge design, viewed from the back of the pendant.

Drawing "D" is a 45° representation of the live-hinge design, viewed from the side of the pendant.

FIGS. 5(A and B) show full-scale drawings of a grooved pendant in which the groove is cut down from the top, near the back surface:

Drawing "A" is a 45° representation, viewed from the front of the pendant.

Drawing "B" is a 45° representation of the fixed-hinge design, viewed from the side of the pendant.

FIGS. 6(A–C) show full-scale drawings of a pendant in which a moveable jaw element supports the lower half of the groove:

Drawing "A" is a 45° representation, viewed from the front of the pendant.

Drawing "B" is a 45° representation, viewed from the back of the pendant.

Drawing "C" is a 45° representation, viewed from the side of the pendant.

FIGS. 7(A–F) show full-scale drawings of the flanged and flanged-concave models of pendant:

Drawing "A" is a 45° representation of the flanged-concave model, viewed from the front of the pendant.

Drawing "B" is a 45° representation of the flanged-concave model, viewed from the back of the pendant.

Drawing "C" is a 45° representation of the flanged-concave model, viewed from the side of the pendant.

Drawing "D" is a 45° representation of the flanged model (not concave), viewed from the back of the pendant.

Drawing "E" is a 45° representation of the flanged model (not concave), viewed from the side of the pendant.

Drawing "F" is a full-scale drawing of a flanged or flanged-concavependant gripping a clip-on sunglasses frame, viewed from the back. (The sunglasses are not part of the patent.)

FIGS. 8(A and B) show reduced (A) and full-scale (B) drawings of the parallel wire pendant:

Drawing "A" is a 45° not-to-scale (reduced) representation of the parallel wire pendant, viewed from the front.

Drawing "B" is a full-scale drawing of the parallel wire pendant gripping a clip-on sunglasses frame, viewed from the front. (The sunglasses are not part of the patent.)

FIGS. 9(A–E) show reduced (A,B) and full-scale (C,D,E) drawings of the cord that is attached to the grooved and flanged pendants:

Drawing "A" is a 45° not-to-scale (reduced) representation of a two-terminal-end cord, viewed from either the front or the back.

Drawing "B" is a 45° not-to-scale (reduced) representation of a one-terminal-end cord, viewed from either the front or the back.

Drawing "C" is a full-scale representation of a ring aperture and the portion of the cord which passes through the aperture, viewed from either the front or the back.

Drawing "D" is a full-scale representation of a ring aperture on an angled-groove pendant, viewed from the side.

Drawing "E" is a 45° representation of a pendant in which two collars are molded around the ends of a two-terminal-end cord, at the point where the ends meet the pendant, viewed from either the front or the back.

FIGS. 10(A–D) show oversized (A,B,C) and full-scale (D) drawings of the side-channel model of THE CLIPPER™ carrying clip Drawing "A" is a 45° not-to-scale (oversized) representation of the side-channel pendant, viewed from the front.

Drawing "B" is a not-to-scale (oversized) representation of the side-channel pendant, viewed from the side.

Drawing "C" is a not-to-scale (oversized) representation of the side-channel pendant, viewed from the top.

Drawing "D" is a full-scale drawing of the side-channel pendant gripping a clip-on sunglasses frame, viewed from the front. (The sunglasses are not part of the patent.)

DETAILED DESCRIPTION OF THE PREFERRED EMBODIMENTS

Figure 1A:
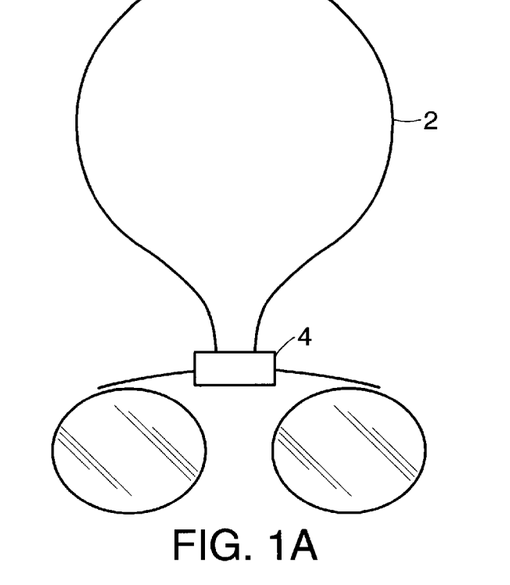
Figure 1B:
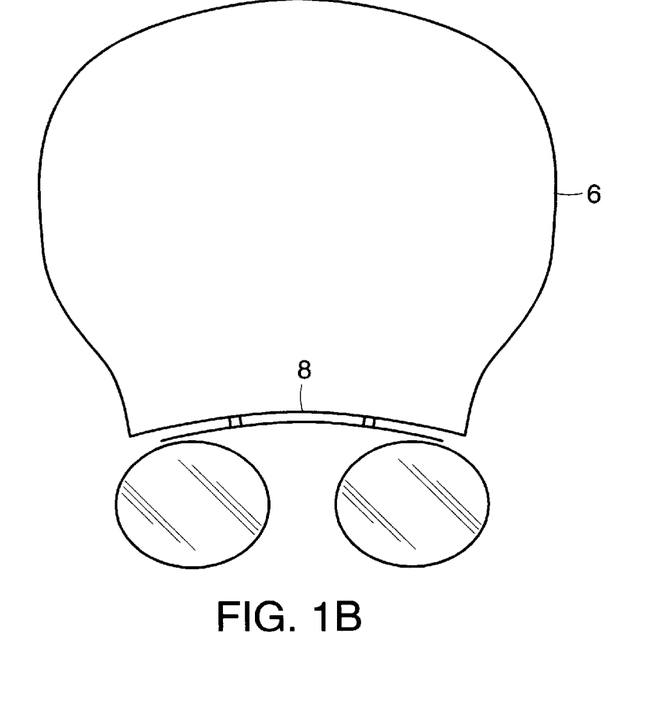
Figure 2A:
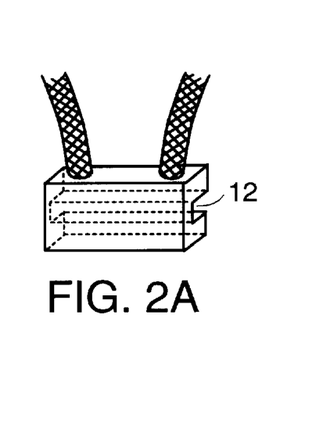
Figure 2B:
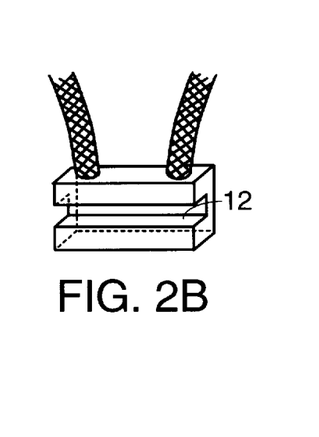
Figure 2C:
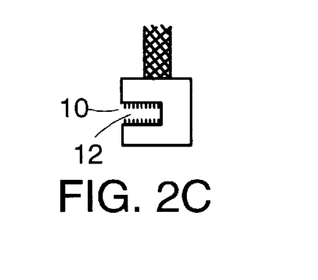
Figure 2D:
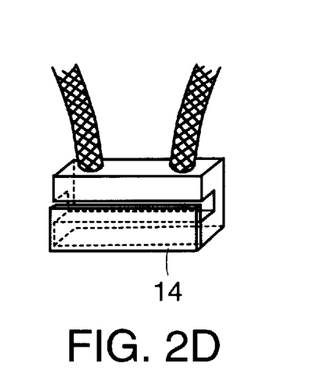
Figure 2E:
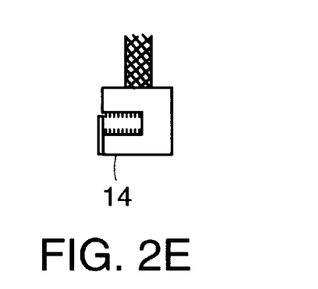
Figure 2F:
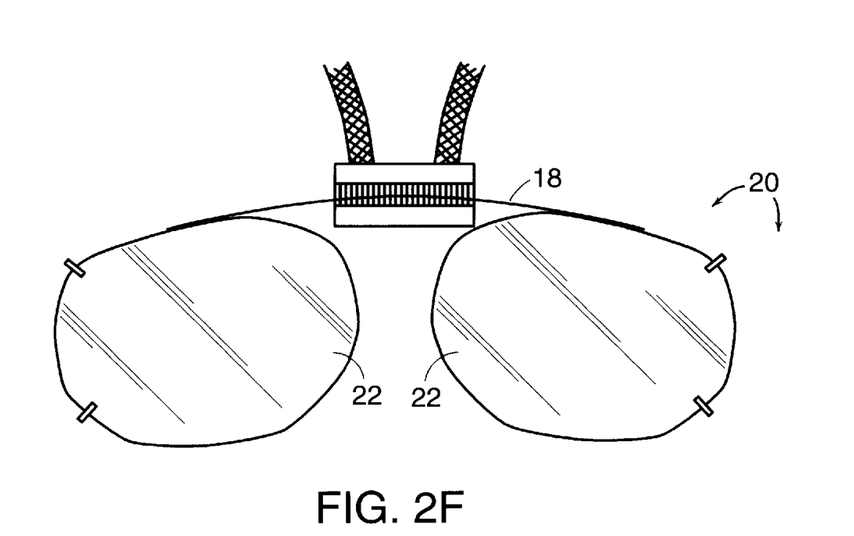

THE CLIPPER™ carrying clip is a pendant-like device (see FIGS. 1) which hangs around the neck and holds tension-mounted clip-on sunglasses in a forward-facing position at mid-chest level. When the sunglasses are removed from THE CLIPPER™ carrying clip and attached to the eyeglasses, THE CLIPPER™ carrying clip is a decoration for the user. All models consist of a pendant 2,6 that is suspended at mid-chest level by a cord 4,8 which loops behind the neck of the user.

A. The Pendant

The pendant 2,4, of THE CLIPPER™ carrying clip grips the clip-on sunglass frame by any of several means, including friction 12 (FIG. 2C), 24 (FIG. 3C) 40 (FIG. 5B) 56 (FIG. 7B) 84 (FIG. 8A), spring tension from the pendant 32 (FIG. 4D), 46 (FIGS. 6) or from the clip-on frame (FIG. 10D); or a flexible barrier 10,12 (FIGS. 2). The four general types are the grooved FIGS. 2,3,4,5,6 the flange-type ("flanged") FIGS. 7, the parallel wire FIGS. 8 and the side-channel models FIGS. 10. Grooved models FIGS. 2,3,4,5,6 have a groove 12 (FIGS. 2), 24 (FIGS. 3), 30,31 (FIGS. 4), 34 (FIGS. 5), 48 (FIGS. 6) that is cut into the pendant, either from the top of the pendant 34 (FIGS. 5) or from a side surface 1 2 (FIGS. 2), 24 (FIGS. 3), 30,31 (FIGS. 4), 48 (FIGS. 6). Flanged FIGS. 7 and parallel wire FIG. 8B models have two U-shaped flanges 56,70 (FIGS. 7), 84 (FIGS. 8) which project from the pendant. The groove 12 (FIGS. 2), 24 (FIGS. 3), 30,31 (FIGS. 4), 34 (FIGS. 5), 48 (FIGS. 6) or the flanges 56,70 (FIGS. 7), 84 (FIGS. 8) hold the connecting bar 18 (FIGS. 2) of clip-on sunglasses frame 20 (FIGS. 2).

Side-channel models FIGS. 10, by contrast, hold the sunglasses by means of the spring tension between the two lenses FIG. 6D. These models have two channels 129 (FIG. 10A) running from top 130 to bottom 131 of each vertical side 132, the width of which 132 may taper toward the bottom of the channel 133. The side channels 132 may also be connected by a horizontal channel 134 running across the top of the pendant 130.

In the basic grooved model FIGS. 2, the groove 12 is lined with friction material 10, such as Velcro 10 or an elastomeric substance. The center of the connecting bar 18 on the clip-on frame 18 is inserted into the groove 12. Friction material 10 in the groove 12 grips the bar 18 and holds the clip-on frame 20 securely. The lenses 22 of the sunglasses hang down in front of the user, facing forward in a natural manner. A flexible plastic barrier 14 covers the opening of the groove 12 in some models, which prevents the connecting bar 18 from slipping out of the groove 12 under extreme jostling.

Figure 3A:
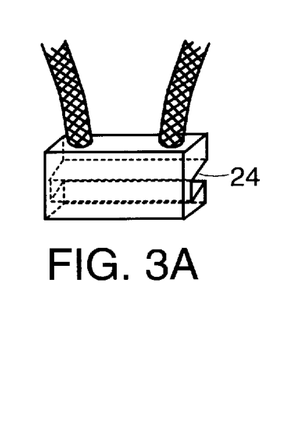
Figure 3B:
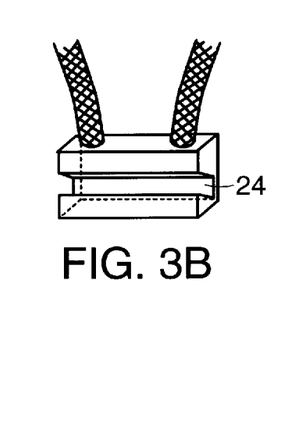
Figure 3C:
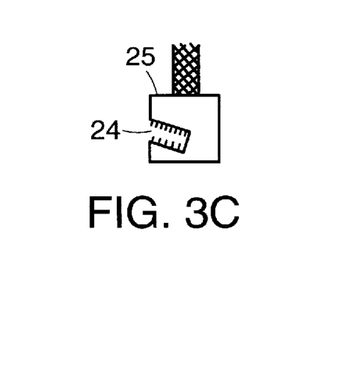
Figure 4A:
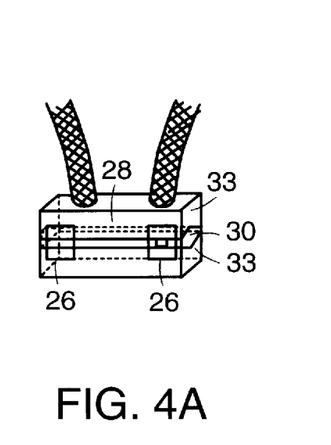
Figure 4B:
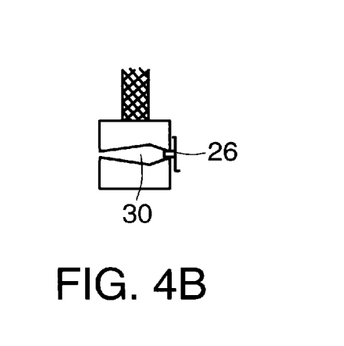
Figure 4C:
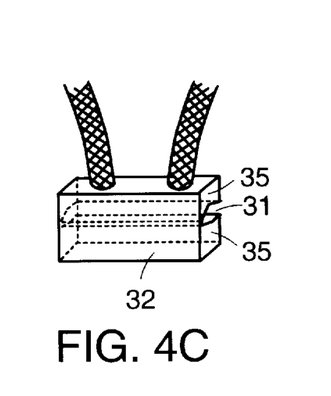
Figure 4D:
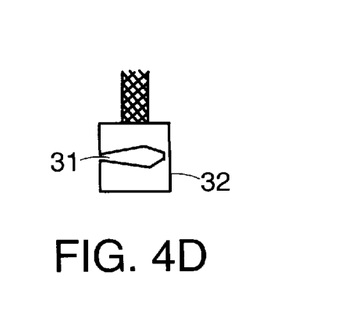

A variation of the basic grooved model FIGS. 3 contains a groove 24 which is angled downward from the top of the pendant 25, which reduces the likelihood that the sunglasses 20 (FIGS. 2) will fall out of the groove 24 (FIGS. 3) under extreme jostling.

In a second grooved model FIGS. 4, the groove 30,48 opens by means of a live hinge 32 or by means of a rigid hinge 26 that is set with a low-tension spring 28. The groove 30,31 is closed by the tension of the live hinge 32 or the spring 28 when THE CLIPPER™ carrying clip is not in use. The user opens the groove 30,31 to insert the clip-on frame 20 (FIGS. 2). The tension from the live hinge 32 (FIGS. 4) or the spring 28 closes the arms of the pendant 33,35 around the connecting bar 18 (FIGS. 2) of the clip-on frame 20 (FIGS. 2), holding it securely and facing forward from the user. The groove 30,31 (FIGS. 4) may or may not contain friction material 20 (FIGS. 2).

Figure 5A:
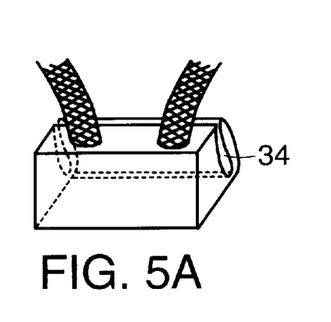
Figure 5B:
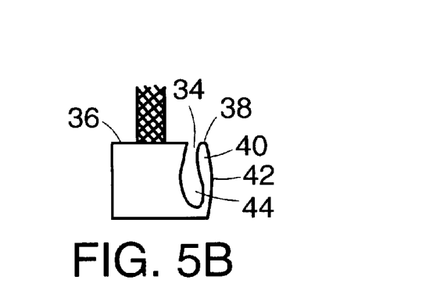
Figure 6A:
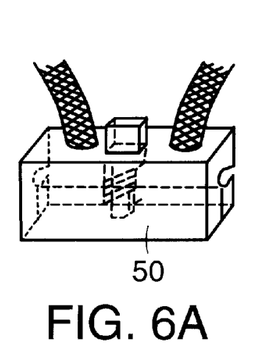
Figure 6B:
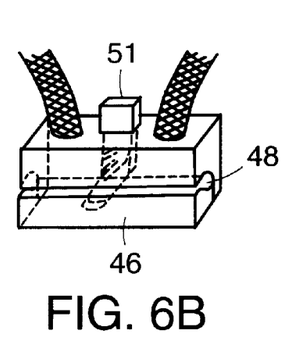
Figure 6C:
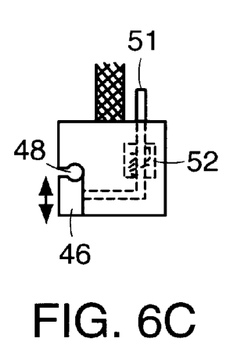

In a third grooved model FIGS. 5, the groove 34 is cut downward from the top of the pendant 36, very close to one of the rectangular intersecting side surfaces 42 (generally the surface facing the chest of the user). The groove 34 on this model has an elongated balloon shape rather than a rectilinear shape, and is narrow at the top 38 with a widening toward the bottom 344. The pendant is made of soft plastic, which allows the thin side of the groove 40 to flex, so as to admit the connecting bar 18 (FIGS. 2) of a clip-on frame 20. Pressure from the thin side of the groove 40 (FIGS. 5) holds the clip-on frame 20 (FIGS. 2) securely and facing forward from the user.

In a fourth grooved model FIGS. 6, the pendant 50 contains a jaw element 46 which moves downward from the groove 48 when a release button 51 that is attached to the jaw element 46 is pressed down by the user. After the jaw element 46 has been opened, the clip-on frame 20 (FIGS. 2) is inserted into the groove 48 (FIGS. 6). Tension from an internal spring 52 moves the release button 51 and the jaw element 46 upward and closes the jaw element 46 against the connecting bar 18 (FIGS. 2) that is now located inside the groove 48 (FIGS. 6). Pressure from the spring 52 holds the frame 20 (FIGS. 2) securely, facing forward from the user. The groove 48 (FIGS. 6) may or may not contain friction material 20 (FIGS. 2).

The flanged model FIGS. 7 has two flanges 56,70 which project from the pendant 58,72. The flanges 56,70 are made of a flexible material. Each flange 56,70 has a balloon-shaped cut-out 62,76 which opens (at its narrow end 64,78) onto one end of the flange 56,70 and which, at the center of the flange 62,76 is about the size of the connecting bar 18 (FIGS. 2) of a clip-on frame 20 (FIGS. 2). The lips 66,80 (FIGS. 7) of the cut-out are rounded at the opening 64,78 (FIGS. 7) and the distance between them is slightly smaller than the diameter of the connecting bar 18 (FIGS. 2). The frame 20 (FIGS. 2) is inserted by pressing the connecting bar 18 (FIGS. 2) against the lips 66,80 (FIGS. 7) with enough pressure to flex the walls of the flanges 60,74 (FIGS. 7) and push the bar 18 (FIGS. 2) into the inside of the cut-outs 62,76 (FIGS. 7). A combination of pressure from the walls of the flanges 60,74 (FIGS. 7) and the lips of the cut-outs 66,80 holds the frame 18 (FIGS. 2) securely and facing forward from the user (FIGS. 7F).

A variation of the flanged model, called the concave-flanged model, has a concave surface 68 (FIGS. 7) on the pendant 58, to which convex surfaces on the flanges 69 are attached. The lips of the flanges 66,80 touch the plane of the outer perimeter 71 of the concave surface 68.

Figure 8A:
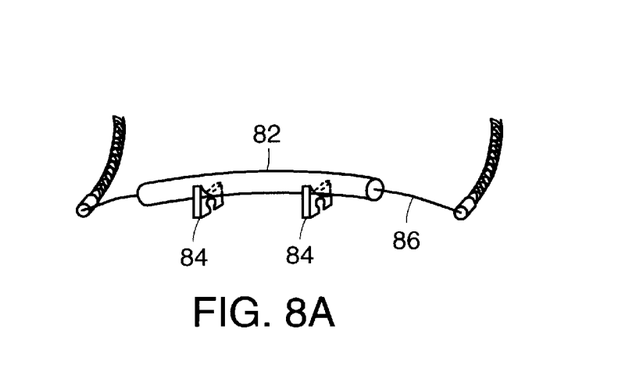
Figure 8B:
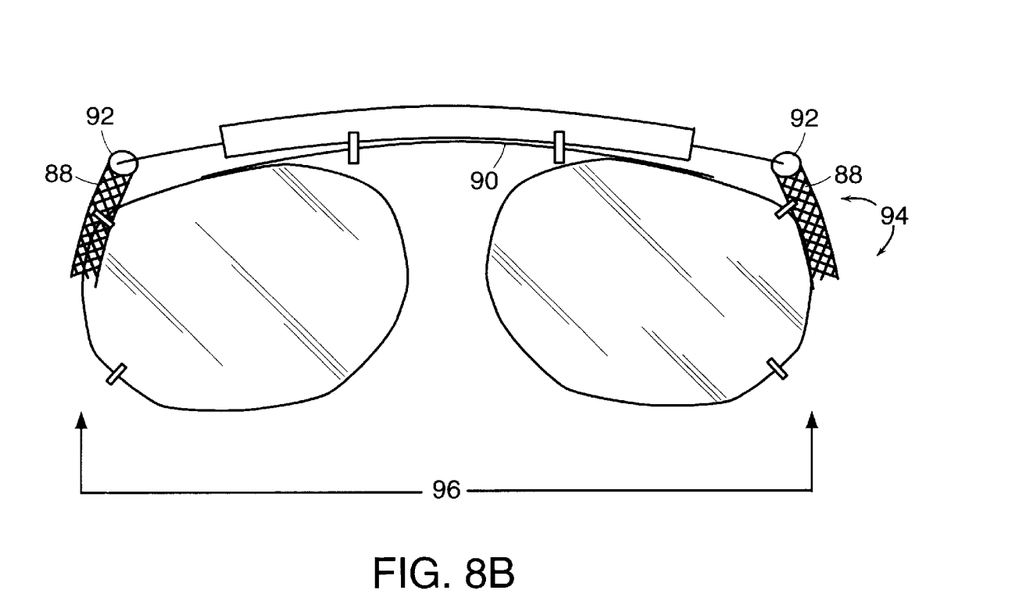

The parallel wire pendant FIGS. 8 has a bar 86 which runs parallel to the connecting bar 90 of the clip-on frame 94. Flanges 84 mounted near the center of the pendant 82 grip the connecting bar 90. The outer ends of the pendant 92 terminate at approximately the outer edges of the clip-on frame 96. The ends of the cord 88 are attached to the outer ends of the pendant 92. This model FIGS. 8 remains attached to the clip-on frame 94 when the user is wearing the clip-ons 94. When the clip-ons 94 are removed from the eyeglass frame, they hang in front of the user.

Figure 7A:
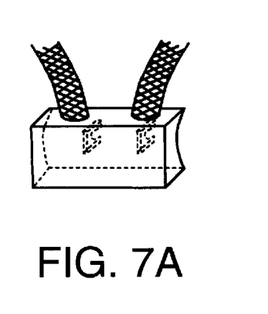
Figure 7B:
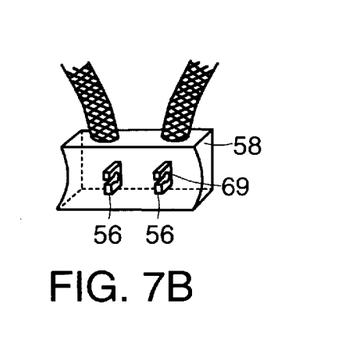
Figure 7C:
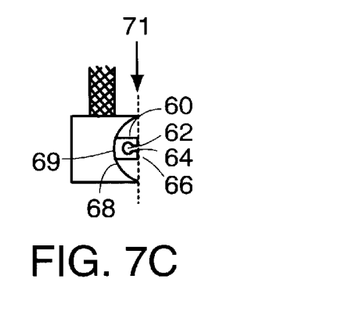

The width of all grooved pendants FIGS. 2,3,4,5,6 and concave-flanged pendants FIGS. 7A–C (measured from left to right when being worn by a user) at the location of the groove 1 2 (FIGS. 2), 24 (FIGS. 3), 30,31 (FIGS. 4), 34 (FIGS. 5), 48 (FIGS. 6) or the flanges 56 (FIGS. 7) will range from one half inch to one and one-half inches. Such dimension is narrow enough to fit between the lenses 22 (FIGS. 2) of a clip-on frame 20 (FIGS. 2), but wide enough to stabilize the frame 20 in a horizontal position. Above and below the location of the groove 12 (FIGS. 2), 24 (FIGS. 3), 30,31 (FIGS. 4), 34 (FIGS. 5), 48 (FIGS. 6) or the flanges 56 (FIGS. 7), the width of the grooved pendant FIGS. 2,3,4,5,6 or the concave-flanged pendant FIG. 7A-C may be much greater than described above, depending upon the design.

Figure 7D:
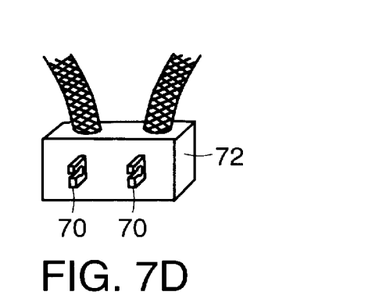
Figure 7E:
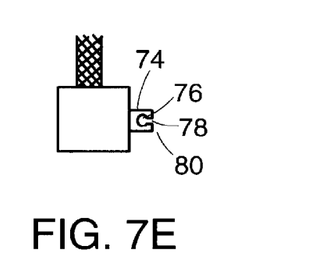
Figure 7F:
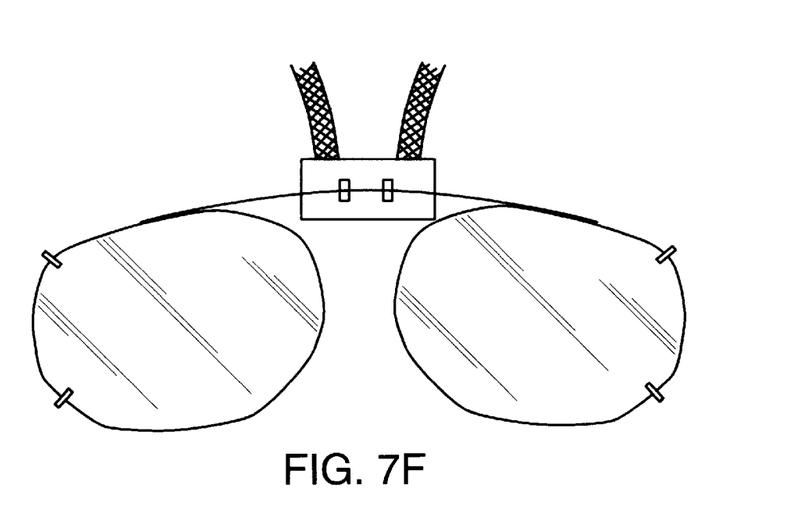

Flanged models which are not concave FIGS. 7D,E may be any width that is attractive as a pendant 72 (FIGS. 7), which may be up to several inches wide.

The basic model of all grooved pendants FIGS. 2,3,4,5,6 and the concave-flanged pendant FIGS. 7A–C is the shape of a square peg, approximately the size of a pair of dice held side by side. Other models are round, approximately the size of a quarter. Other models are oval, capsule-shaped, diamond-shaped, heart-shaped, triangular or abstract shapes. Still other models are shaped to resemble sailboats, land or sea animals, musical instruments or any number of other representations of common objects. These shapes may extend up to several inches above or below the groove 12 (FIGS. 2), 24 (FIGS. 3), 30,31 (FIGS. 4), 34 (FIGS. 5), 48 (FIGS. 6) or the flanges 56 (FIGS. 7) and may become much wider than the groove 12 (FIGS. 2), 24 (FIGS. 3), 30,31 (FIGS. 4), 34 (FIGS. 5), 48 (FIGS. 6) or the flanges 56 (FIGS. 7) at points where the pendant FIGS. 2,3,4,5,6,7A–C is clear of the edges of the clip-on frame lenses 22 (FIGS. 2).

Flanged pendants which are not concave FIGS. 7D,E have no basic model shape. These pendants 58,72 may be any of the shapes described.

The length of the pendant 4 (FIGS. 1) (measured from top to bottom when being worn by a user), whether grooved FIGS. 2,3,4,5,6 or flanged FIGS. 7 may vary from one-quarter inch to several inches, depending upon the design.

Figure 10A:
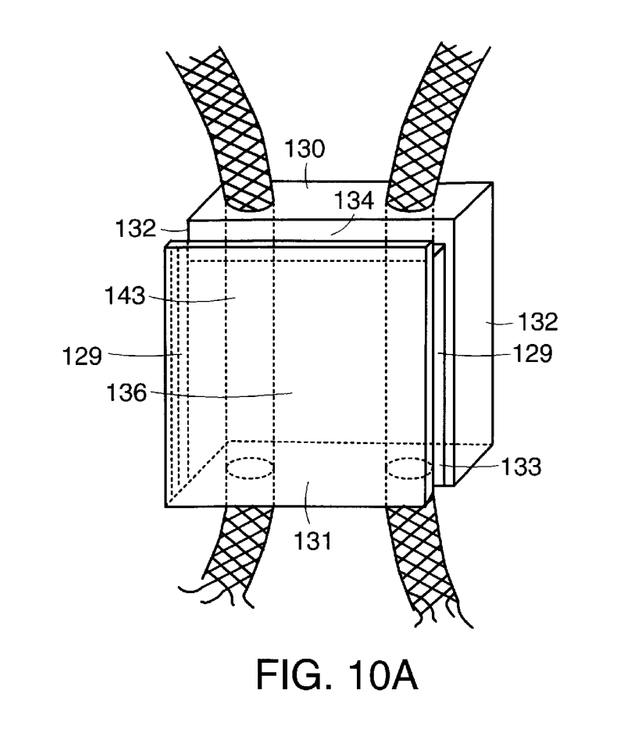
Figure 10B:
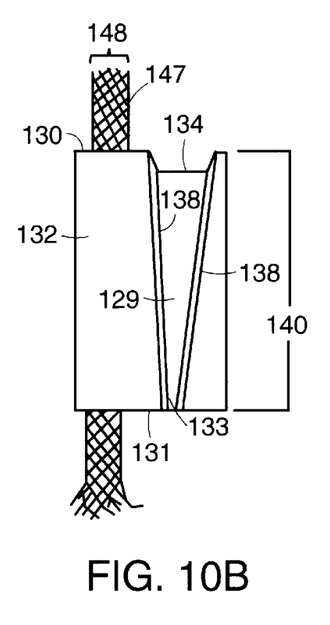
Figure 10C:
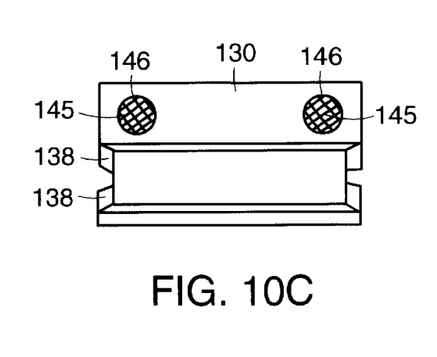
Figure 10D:
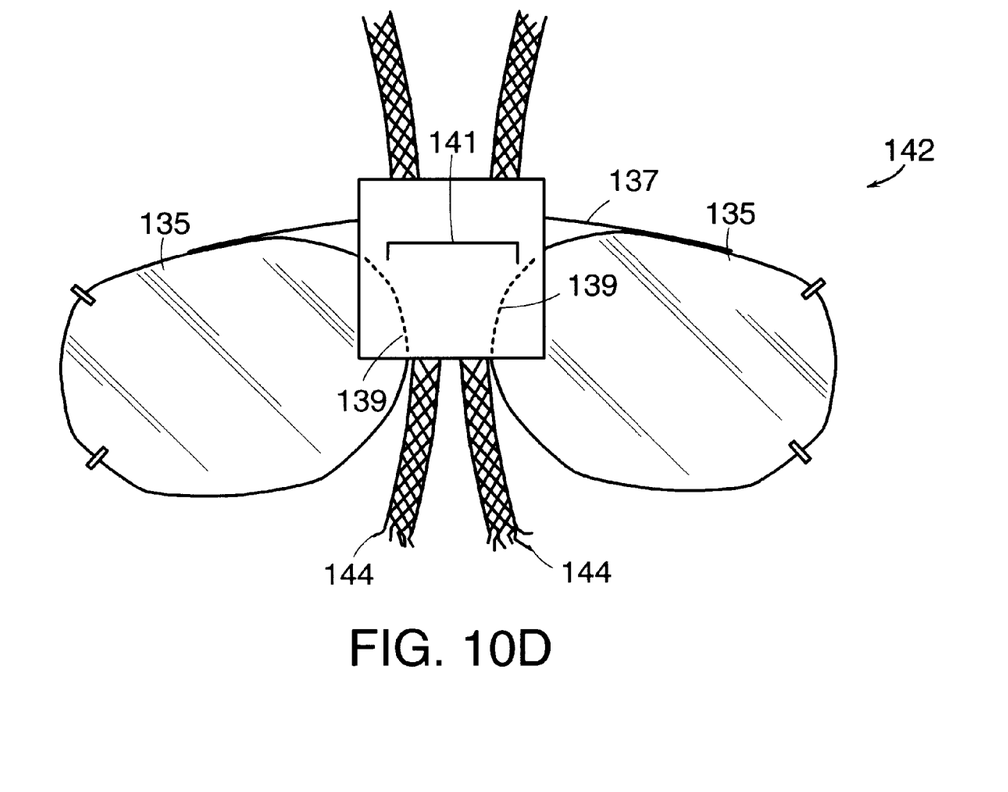

The side-channel model FIGS. 10 has nearly-square profile when viewed from the front FIGS. 10D, and a vertically-rectangular profile when viewed from the side FIG. 10B. Each vertical side surface 132 is cut by a channel 129 running its vertical length 140. Each channel 129 is approximately one-eighth inch deep. The width of the channels 129 may vary, depending upon the width of lens 135 that it is made for. The channels 129 also taper in width from wider at the top 130 to narrower at the bottom 133 of the pendant, so as to pinch slightly upon the lenses 135 when the clip-on is fully inserted FIG. 10D.

The channels 129 are separated by the core 136 of the pendant, i.e. the width of the pendant that lies between the channels 129 when viewed from the front FIG. 10A. The width of the core 136 is slightly greater than the distance 141 between the clip-on lenses 135. Depending upon the size of the frame 142 for the pendant is intended, the width of the core 136 may vary from one-half inch to one-and-one half inches. The lenses 135 are inserted into the channels 129 from the top 130 of the pendant. As the lenses 135 slide down into the channels 129, the core 1 36 wedges the lenses 135 apart. As the lenses 135 are spread, the tension of the spring-bar 137 is activated and the lenses 135 grip onto the core 136 of the pendant. In models with tapered channels 129, the walls 138 of the channels 129 also grip onto the inside edges 139 of the lenses 135 as they reach the fully-inserted position, holding the frame 142 more securely.

B. The Cord

As shown on FIG. 9, THE CLIPPER™ carrying clip includes a length of cord 98,108,118 that is either attached to the pendant 106,110,120, or is inserted through the pendant 143 at both ends 144 by means of two holes 145 cut vertically through the pendant, like a bolo tie FIG. 10D. In attached-cord models, the cord is attached either by fastening both ends 100 to the pendant 106; or by fastening one end of the cord 1 08 to the cord itself 114 near the remaining end 116, and attaching the remaining end 116 to the pendant 110; or by looping the cord 118 through a ring aperture 122 that is attached to the top surface 124 of the pendant 120.

Figure 9A:
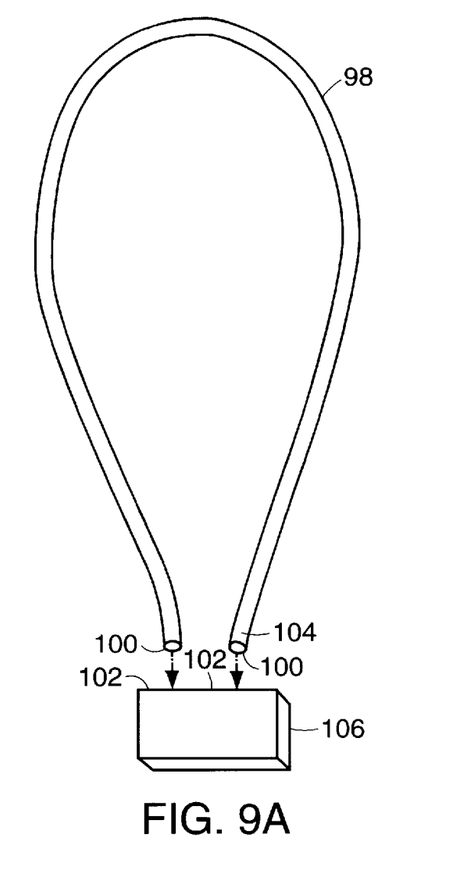
Figure 9B:
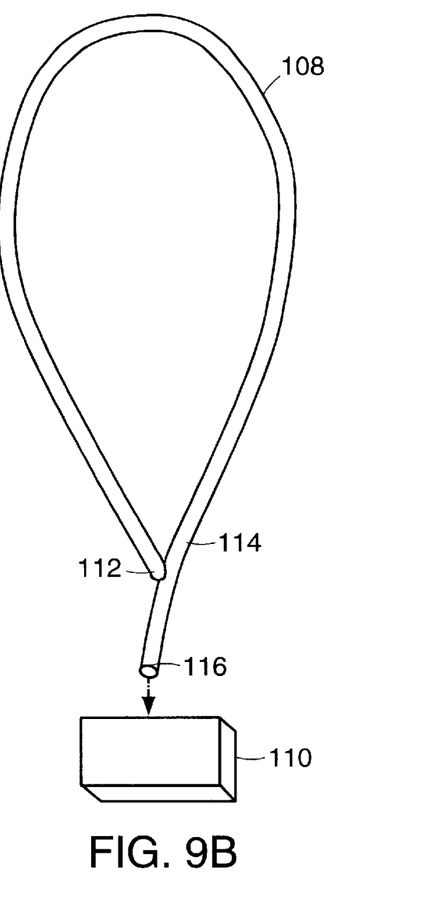
Figure 9C:
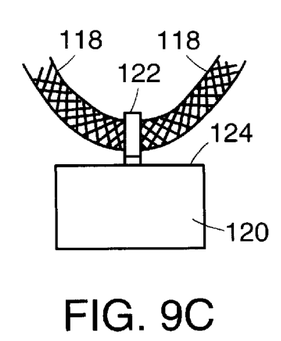
Figure 9D:
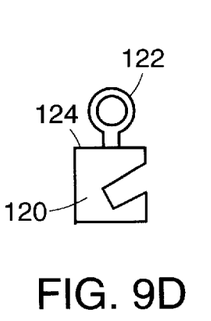
Figure 9E:
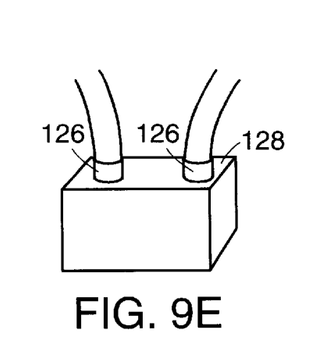

Models of cords 98,108 that are fastened to the pendant 106,110 are secured by insertion molding, glue or metal or plastic fastening methods. One variation for fastening cord 98 adds two collars 126 which project approximately one-eighth inch above the top surface of the pendant 128, and which encircle the ends of the cord 98 at the point where they are attached to the pendant 102. These collars 126 add strength to the attachment points 102.

The model of cord 118 that is looped through a ring aperture 122 is fastened to itself 118 at the two terminal ends 100, by means of glue, sewing or metal or plastic fastening methods.

A variation attached models of cord 98,108 employs a detachable fastening method on one end 104, which allows the pendant 4 (FIGS. 1) to be removed from the neck of the user without bringing the cord 98 (FIGS. 9) over the user's head. One type of detachable fastening method works by screwing a die-cut female component, which is attached to one end of the cord, over a threaded male component that is located at the top of the pendant. Other types of fastening methods have the male component attached either to the pendant or to the end of the cord, and work by friction between the male and female components or by means of a squeeze-release device on the female component.

In the bolo tie models FIG. 10D, the cord slides through the pendant 143 with modest resistance. Such resistance is established by means of friction between the walls 146 of the holes 145 through which the cord is inserted and the surface 147 of the cord. Such friction is created by sizing the holes 143, 145 to a diameter slightly smaller than the diameter 1 48 of the cord, or by changing the direction of the holes 143 as they cut through the pendant.

THE CLIPPER™ carrying clip FIGS. 1 comes in many colors of cord 98,108,118 (FIGS. 9), including weaves and other fashion designs. It also comes in many colors of pendant 4 (FIGS. 1) and is enhanced with molded, engraved, raised or color-stamped designs.

The present invention will be further illustrated with reference to the following examples which aid in the understanding of the present invention, but which are not to be construed as limitations thereof. All of the examples discussed below are illustrated in the drawings accompanying this specification. Reference should be made thereto as necessary by the reader for a full understanding of this invention.

EXAMPLES

A. The Pendant

1. Grooved and Flanged Models

Grooved and flanged pendants were made by forming a sculpting material (e.g., wood or plastic) into the shape of a square peg, measuring approximately 1"×9/16"×1/2".

a. Grooved Model

A flat-bottomed (i.e., square-cornered) groove, measuring approximately 1"×1/8" at the surface, was cut approximately 5/16" deep into one of the 1"×1/2" rectangular surfaces. The cut was centered between the long edges of said surface, splitting said surface plane into two planes which each measured approximately 1"×3/16", and which were separated by the 1/8" groove.

The groove was lined with Velcro, which consisted of a self-adhesive backing covered by a matt of flexible, hooked bristles. The fabric component of Velcro was not used on THE CLIPPER™.

The peg was positioned on a table. The 1"×9/16×" rectangular surfaces were identified as the top and the bottom. The 1"×1/2" rectangular surface which did not contain a groove was identified as the front. The 1"×1/2" rectangular surface which contained the groove was identified as the back. The ½"×9/16" surfaces were identified as the sides.

Because of the groove, the side profile of the peg was U-shaped. The arms of the U measured each approximately 9/16"×3/16". The connecting wall of the U measured approximately ½"×¼".

While the peg was positioned as described above, two holes were cut into the rectangular top surface. Each hole had a diameter of approximately 3/16" and a depth of approximately 1/8". Each hole was centered, respectively, approximately ¼" from one of the short edges of the surface. The holes were centered between the long edges of the surface.

b. Flanged Model

The peg was positioned on a table. The 1"×9/16" rectangular surfaces were identified as the top and the bottom. The 1"×½" rectangular surfaces were identified as the front and back. The ½"×9/16" surfaces were identified as sides.

A flange was formed from the same sculpting material that was used for the peg. The flange measured approximately ¼"×7/32"×1/16". The flange was positioned on a table. The ¼"×7/32" surfaces were identified as the top and bottom. The ¼"×1/16" surfaces were identified as the front and back. The 7/32"×1/16" surfaces were identified as the sides.

The front surface was carved into a "convex vaulted surface," which was defined as a smooth, outwardly-rounded surface that had a convex profile when the flange was viewed from the top or bottom.

A curvilinear cut was made into the flange, beginning and ending at the front, which resulted in a balloon-shaped cut-out appearing when the flange was viewed from the top or bottom. The perimeter of the cut-out began at the front surface, approximately 1/64" from the plane which was parallel and equidistant from the planes of the two side surfaces (the "center-plane"). Said perimeter moved parallel to said center-plane until it reached a point approximately 1/16" from said surface ("Point A"). Upon reaching Point A, said perimeter moved in a circle on a radius of 3/64", until it again reached a point approximately 1/16" from said surface and 1/64" from said center-plane ("Point B"). Said perimeter then moved parallel to said center-plane from Point B to said surface. The corners of the cut-out at its opening to said surface were then rounded off.

A second flange was formed and cut in a manner identical to that described above. The flanges were vertically centered on the back surface of the peg, with the planes of the top and bottom flange surfaces parallel to the planes of the side surfaces of the peg. Each flange was positioned, respectively, approximately ¼" from the nearest side surface of the peg. The flanges were glued to the back surface of the peg.

C. Flanged-Concave Model

The peg was positioned on a table in a manner identical to that described above for the flanged model. Two flanges were made in a manner identical to that described above for the flanged model.

The back surface of the peg was carved into a "concave vaulted surface," which was defined as a smooth, inwardly-rounded surface that had a concave profile when viewed from the side of the peg. The distance between the vertical center of the concave vaulted surface and the plane of the perimeter of the back side was ¼".

The back surfaces of both flanges were then carved to conform to the shape of the concave vaulted surface of the peg, when positioned on said surface with the planes of the top and bottom flange surfaces parallel to the planes of the side surfaces of the peg. The flanges were positioned on the concave vaulted surface of the peg in the manner described in the foregoing sentence, and vertically centered on said surface. Each flange was positioned approximately ¼", respectively, from the nearest side surface of the peg. The flanges were glued to the concave vaulted surface of the peg.

2. Parallel Wire Model

A sculpting material (e.g., wood or plastic) was formed into a cylinder, measuring 1" in length and having a diameter of 1/8". A 3/16"-diameter hole was drilled, length-wise, through the center of this cylinder.

A flange was formed from the same sculpting material that was used for the peg. The flange measured approximately 3/16"×1/8"×1/16". The flange was positioned on a table. The 3/16"×1/8" surfaces were identified as the top and bottom. The 1/8"×1/16" surfaces were identified as the front and back. The 3/16"×1/16" surfaces were identified as the sides.

The back surface was carved into a "concave vaulted surface," which was defined as a smooth, inwardly-rounded surface that had a concave profile when the flange was viewed from the top or bottom. The concave surface was a perfect semi-circle, having a radius of 1/16".

A curvilinear cut was made into the flange, beginning and ending at the front, which resulted in a balloon-shaped cut-out appearing when the flange was viewed from the top or bottom. The perimeter of the cut-out began at the front surface, approximately 1/64" from the plane which was parallel and equidistant from the planes of the two side surfaces (the "center-plane"). Said perimeter moved parallel to said center-plane until it reached a point approximately 1/16" from said surface ("Point A"). Upon reaching Point A, said perimeter moved in a circle on a radius of 3/64", until it again reached a point approximately 1/16" from said surface and 1/64" from said center-plane ("Point B"). Said perimeter then moved parallel to said center-plane from Point B to said surface. The corners of the cut-out at its opening to said surface were then rounded off.

A second flange was formed and cut in a manner identical to that described above. The concave vaulted surfaces of both flanges were then fitted and glued to the cylinder. Each flange was approximately 1/8" from the nearest end of the cylinder.

A length of 3/64"-diameter round steel wire was cut to a length of 5 inches. The cylinder was slipped over this wire and secured by glue at each end.

3. Side-channel Model

The side-channel pendant was made by forming a sculpting material into the shape of a flattened square, having square front and back dimensions of approximately 1"×1" and rectangular dimensions on all four sides of approximately 1"×5/8".

The pendant was positioned on a table, such that the square surfaces were both perpendicular to the table top. The square surfaces were identified, respectively, as the front and the back. The rectangular surface that rested on the table top was identified as the bottom, and the surface opposite to the bottom was identified as the top. The rectangular surfaces which were perpendicular to the table top were identified as the sides.

A channel was cut approximately 3/16" deep into both of the side surfaces. The bottoms of the channels were flat. The width of the channels at the surface planes of the sides were both approximately ¼" where they intersected the top surface of the pendant. Said surface width tapered to approximately ¹⁄₁₆" where the channels intersected the bottom surface of the pendant. The sides of the channels angled inward (toward each other) between said surface planes and the bottoms of the channels, such that a cross-section of either channel where it intersected the top surface of the pendant was a three-sided trapezoid, and such a cross-section near the bottom of the pendant was approximately "V"-shaped.

The width of the channels at the point where they intersected the top surface of the pendant, varied on different prototypes. On one prototype, such width was ³⁄₃₂". On another prototype, such width was ⅜". Another variable was introduced on some prototypes by increasing depth the channels in the center area of the sides, in a manner resembling a bell-shaped curve, to a depth of between ¼" and ½" at the center. Such a variation gave the core of the pendant (the core being that portion of the pendant which separated the channels) an hour-glass-shaped profile when viewed from front or back.

For all prototypes, the center-line of the channel on each side surface was off-center by approximately ⅛" in the direction of the front surface and away from the back surface. Such off-centering provided room between the channels and the back surface to insert the cord to hold the pendant around the user's neck.

After the side channels were cut, a groove was cut into the top surface of the pendant, connecting the two side channels. The depth of this groove was approximately ⅛". The purpose of this groove was to admit the connecting bar of the clip-on sunglasses frame when the lenses were inserted fully into the channels on the sides of the pendant.

After the channels and the groove were cut, two ¼"-diameter holes were bored through the pendant from the top surface to the bottom surface. Said holes ran parallel to the back surface and were centered at the top surface between the plane of the back surface and the edge of the groove that was cut into the top surface. Each hole was centered, respectively, approximately ³⁄₁₆" from the nearest side surface.

B. The Cord

1. Grooved and Flanged Models

A cord, consisting of braided cotton center in a woven rayon sleeve, was cut to a length of 40". The ends of the cord were glued, respectively, into each of the holes that were cut into the top surface of the pendant. This resulted in the cord becoming a loop, attached at both ends to the pendant. After the loop of cord was attached, the pendant hung loosely around the neck of the user. The pendant could be hung either with the back (containing the groove or the flanges) facing the chest of the user, or with the back facing away from the chest of the user.

The center of the connecting bar on a pair of clip-on sunglasses was placed into the grooves of a grooved pendant and into the flanges of a flanged pendant. The section of the bar that was inserted was equidistant from the inside edges of the two lenses. The friction caused by the friction material in the grooved pendant and by the arms on the flanges of the flanged pendant caused the sunglasses to remain securely inside the groove or the flanges. The lenses of the sunglasses hung directly below said bar. The lenses could be rotated if desired, but they returned to the down-ward position by force of gravity when not being manipulated. Held in this manner, the clip-on sunglass lenses lay flat on the chest of the user.

2. Parallel Wire Models

Two small caps were formed from sheet metal, each having a diameter of ³⁄₁₆" and a length of ¼". The bottoms of the caps were spot-welded to the ends of the wire on the wire pendant, such that the direction from the bottom of the cap to the open top of each cap was perpendicular to the direction from the openings of the cut-outs on the flanges to the cylinder.

A cord, consisting of braided cotton center in a woven rayon sleeve, was cut to a length of 40". The ends of the cord were glued, respectively, into each of the caps on the wire pendant. This resulted in the cord becoming a loop, attached at both ends to the pendant. After the loop of cord was attached, the pendant hung loosely around the neck of the user. When the clip-on frame was attached to the pendant, the frame hung with the pendant. When the clip-on frame was attached to the eyeglass frame, the pendant remained attached to the clip-on frame. The wire pendant held the cord off to the side of the user, such that the cord did not disrupt the user's line of vision.

3. Side-Channel Models

A cord, consisting of braided cotton center in a woven rayon sleeve, was cut to a length of 40". Each end, respectively, was inserted into one hole in the top surface of the pendant and then pulled through the pendant until it extended several inches past the bottom surface of the pendant. When both ends were inserted in the foregoing manner, the cord looped between the tops of the two holes in the pendant. Several inches of cord protruded from each hole below the bottom of the pendant.

After the cord was inserted in the above manner, the ends of the cord were treated by one of the following methods: 1) The ends were tipped with a plastic sleeve measuring approximately ½" long by ⅛" diameter; or 2) the ends were secured by metal collars measuring approximately ⅛" wide by ⅛" diameter and attached approximately ½" from each end. If treated by the second of the above two methods, the ends were then deliberately frayed.

After the above cord was made, a nylon cord of like size and length was also prepared. After insertion through the pendant, the ends of the nylon cord were treated by fusing them under application of heat.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A device for supporting eyewear about the neck of a user, said device comprising:
   an elongated flexible member for being positioned about the neck of the user, said elongated member having first and second terminal ends;
   a retaining member, attached to said elongated flexible member at said terminal ends, and defining an aperture for receiving a portion of the eyewear therein to thereby support the eyewear on the device;

wherein the retaining member comprises a pendant having two channels on opposite sides of said pendant, and a groove in the top of said pendant, suitable for admitting and releasably securing, respectively, the inside edges and the connecting bar of a pair of clip-on sunglasses; and wherein the channels are wider at the point where they intersect the top surface of the pendant, and taper to a narrower width as they reach the point where they intersect the bottom surface of the pendant.

2. The device of claim 1, wherein the channels become deeper in the center areas of the respective sides.

3. The device of claim 1, wherein the ends of the elongated member both pass completely through the retaining member, from top to bottom in the manner of a bolo tie, and are treated by means of a tip, a metal collar, heat fusion or similar treatment.

* * * * *